(12) United States Patent
Katayama et al.

(10) Patent No.: US 10,351,165 B2
(45) Date of Patent: Jul. 16, 2019

(54) STEER BY WIRE STEERING SYSTEM

(71) Applicant: HONDA MOTOR CO., LTD., Tokyo (JP)

(72) Inventors: Hirotaka Katayama, Wako (JP); Yasushi Ueda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 111 days.

(21) Appl. No.: 15/816,059

(22) Filed: Nov. 17, 2017

(65) Prior Publication Data

US 2018/0148088 A1 May 31, 2018

(30) Foreign Application Priority Data

Nov. 29, 2016 (JP) .................................. 2016-231425

(51) Int. Cl.
*B62D 5/04* (2006.01)

(52) U.S. Cl.
CPC ......... *B62D 5/0484* (2013.01); *B62D 5/0478* (2013.01)

(58) Field of Classification Search
CPC ............................ B62D 5/0484; B62D 5/0478
USPC .......................................................... 701/43
See application file for complete search history.

(56) References Cited

U.S. PATENT DOCUMENTS

| 7,698,035 | B2 * | 4/2010 | Chino ..................... | B62D 5/005 180/204 |
|---|---|---|---|---|
| 2007/0215405 | A1 * | 9/2007 | Tsutsumi ............... | B62D 5/001 180/402 |
| 2013/0075185 | A1 * | 3/2013 | Sugai ..................... | B62D 5/001 180/402 |
| 2015/0353128 | A1 * | 12/2015 | Shibuya ................ | B60W 10/02 701/41 |

FOREIGN PATENT DOCUMENTS

| JP | 2004075051 A | 3/2004 |
|---|---|---|
| JP | 2005096745 A | 4/2005 |
| JP | 2006240398 A | 9/2006 |
| JP | 2006327503 A | 12/2006 |
| JP | 2007022461 A | 2/2007 |
| JP | 2007230472 A | 9/2007 |
| JP | 2010195251 A | 9/2010 |
| JP | 2014201269 A | 10/2014 |

OTHER PUBLICATIONS

Japanese Office Action issued in Japanese Patent Application No. 2016-231425, dated May 24, 2018.

* cited by examiner

*Primary Examiner* — Thomas G Black
*Assistant Examiner* — Luat T Huynh
(74) *Attorney, Agent, or Firm* — Armstrong Teasdale LLP

(57) ABSTRACT

A steer by wire steering system for a vehicle includes a reaction force actuator 25, a steering actuator 28, a control unit 40, and a clutch 20, 120 that can selectively connect a steering wheel 11 with road wheels 3 to be steered. The control unit is configured to operate in an emergency mode when a failure is detected while the control unit is operating in a steer by wire mode. The emergency mode includes commanding the clutch to engage, terminating the steer by wire mode, performing a position keep control whereby the steering actuator is driven so as to maintain a fixed steering angle of the road wheels, initiating a power assist mode using the reaction force actuator, and once the clutch is fully engaged, terminating the position keep control.

4 Claims, 6 Drawing Sheets

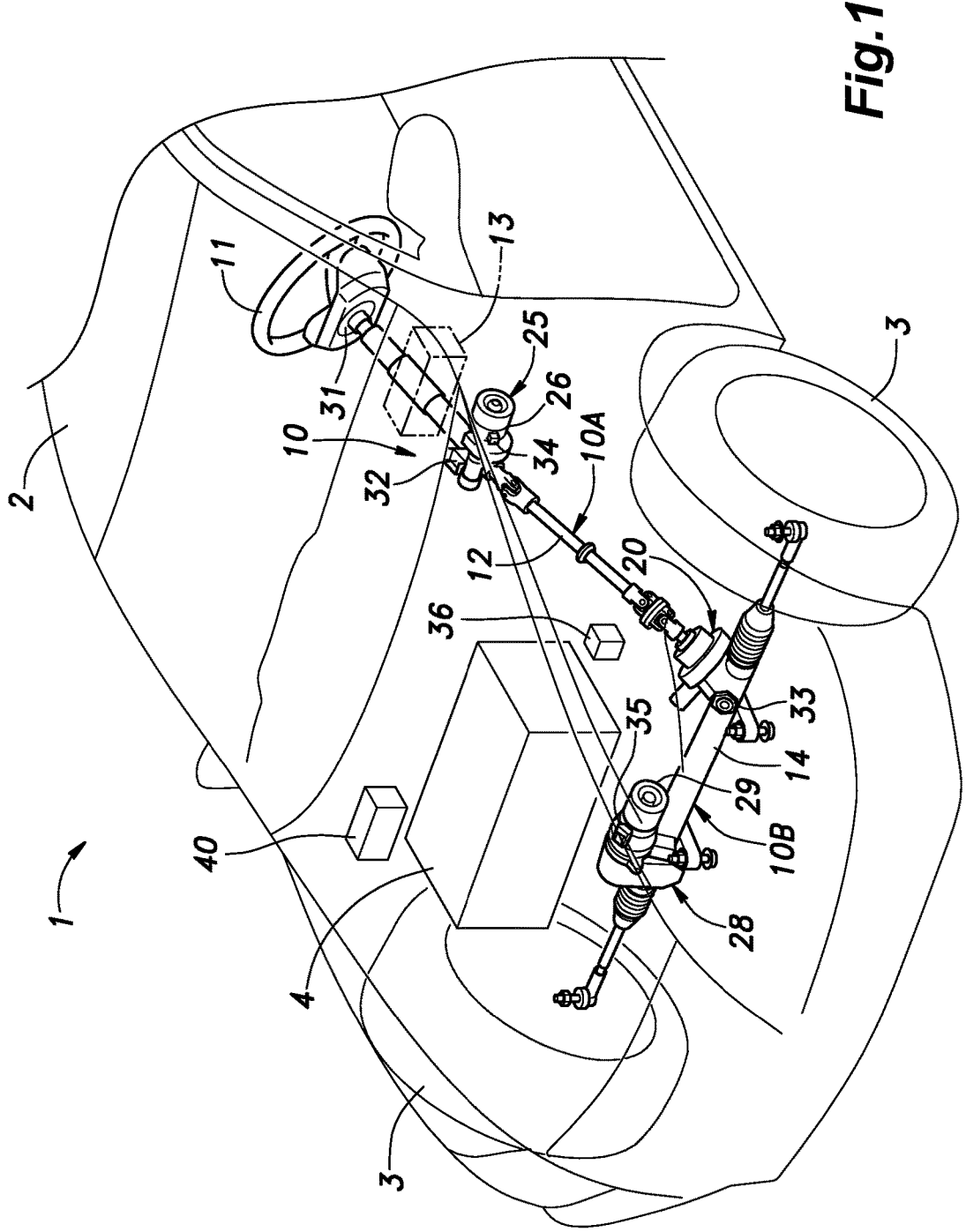

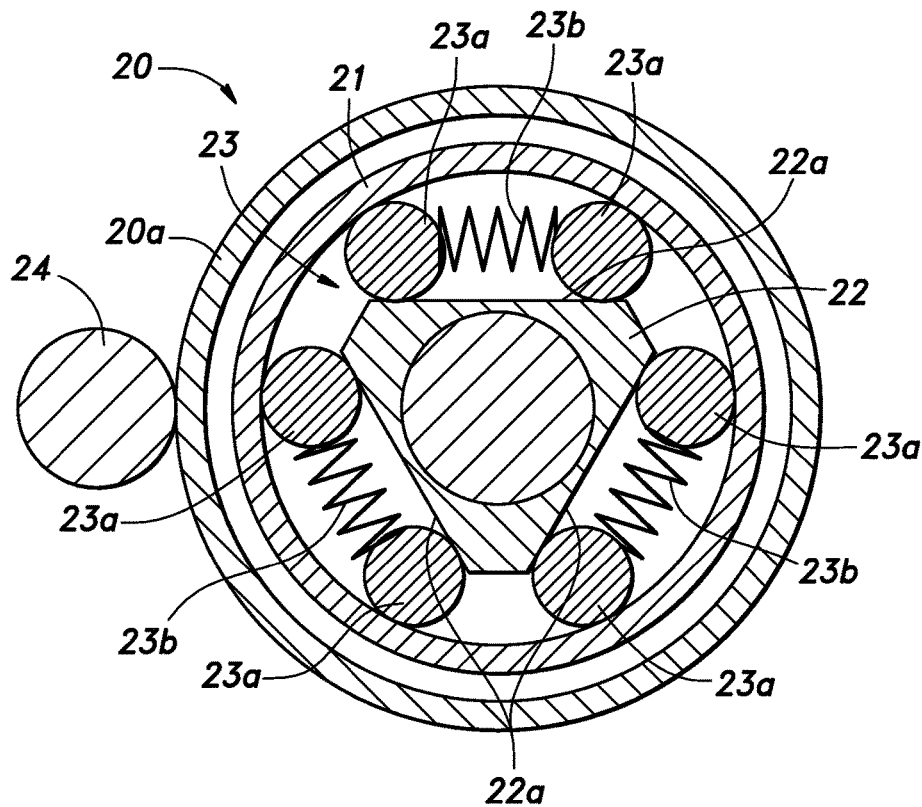
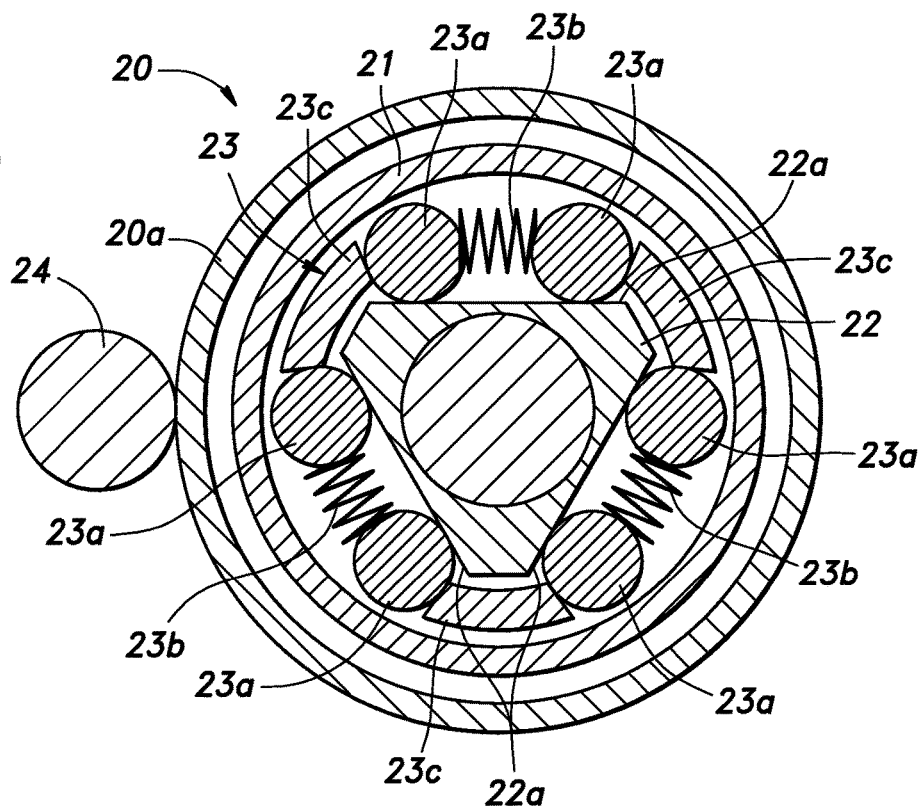

STEER BY WIRE STEERING SYSTEM

TECHNICAL FIELD

The present invention relates to a steer by wire steering system for a vehicle provided with a clutch that can directly connect a steering member such as a steering wheel to a road wheel under a prescribed circumstance.

BACKGROUND ART

Currently marketed passenger vehicles are often equipped with a steer by wire steering device in which front wheels are mechanically decoupled from a steering wheel, and steered by a steering actuator in response to the operation of the steering wheel. In a steer by wire steering device, a steering unit having a steering actuator for turning the front wheels and a reaction force actuator for applying a steering reaction force to a steering wheel is provided. In order to allow the steering operation to be performed at the time of a failure, the steering unit and the steering wheel can be connected to each other via a clutch which is normally disengaged but can be engaged when required. See JP5840168B, for instance.

In such a steer by wire device, when a failure in the steering system is detected, the clutch is engaged so that the road wheels may be directly steered by the steering wheel. However, during the time interval between the detection of the failure and the full engagement of the clutch, the steering system may behave in an unpredictable manner. For instance, the road wheels may be steered by a road surface irregularity. In such a case, the vehicle operator may experience some discomfort. To overcome this problem, it is proposed in JP4635720B to perform a position keep control when a failure of a reaction force actuator is detected, whereby the steering angle of the road wheels is fixed by creating a braking force with the steering actuator for a time period required for verifying the failure. If the failure is verified, and the steering directions of the road wheels and the steering wheel do not agree, the position keep control is discontinued, and the steering actuator is operated according to the steering angle of the steering wheel until the clutch is engaged.

However, in the control method of JP4635720B, an impulsive torque may be transmitted to the steering wheel when the clutch is engaged, causing discomfort to the vehicle operator.

SUMMARY OF THE INVENTION

In view of such problems of the prior art, a primary object of the present invention is to provide a steer by wire steering system for a vehicle that can minimize discomfort to a vehicle operator at the time of a failure of the steering system.

The present invention achieves such an object by providing a steering member for receiving a steering input; a reaction force actuator for applying a reaction force to the steering member; a steering actuator for steering a road wheel; a clutch for selectively connecting the road wheel mechanically to the steering member; a control unit for controlling operation of the reaction force actuator, the steering actuator and the clutch; and a failure detection unit for detecting a failure in the steering system; wherein the control unit is configured to operate in a steer by wire mode whereby the clutch is disengaged, and the reaction force actuator produces a reaction force in a normal manner, and a power assist mode whereby the reaction force actuator produces an assist steering torque corresponding to the steering input applied to the steering member; and wherein the control unit is configured to operate in an emergency mode when a failure is detected by the failure detection unit while the control unit is operating in the steer by wire mode; the emergency mode including commanding the clutch to engage, terminating the steer by wire mode, performing a position keep control whereby the steering actuator is driven so as to maintain a fixed steering angle of the road wheel, initiating the power assist mode, and once the clutch is fully engaged, terminating the position keep control.

The clutch typically requires a certain time period before becoming fully engaged owing to an electromagnetic delay in producing the force required to engage the clutch, and a mechanical delay in completing the mechanical action for engaging the clutch. Owing to such delay factors, the vehicle operator may experience some discomfort when the clutch is engaged. Therefore, according to the present invention, when a failure of the steering system is detected, the control unit commands the clutch to engage, terminates the steer by wire mode, performs a position keep control to maintain the steering angle of the road wheel at a fixed value, and initiates the power assist mode to operate the reaction force actuator as a power assist actuator. Thereby, the reaction force actuator prevents any impulsive torque from being applied to the steering member (such as a steering wheel) when the clutch is engaged, and the steering actuator prevents any unintended movement of the road wheel that could be caused by a road surface irregularity during the time interval between the detection of the failure and the full engagement of the clutch.

The control unit may be configured to start the power assist mode using the reaction force actuator before the clutch becomes at least partly engaged when a failure is detected by the failure detection unit while the control unit is operating in the steer by wire mode.

Thereby, the power assist mode is started before any impulsive torque is transmitted to the steering wheel, and the vehicle operator is prevented from experiencing any discomfort.

More preferably, the control unit is configured to start the power assist mode using the reaction force actuator simultaneously as commanding the clutch to be engaged when a failure is detected by the failure detection unit while the control unit is operating in the steer by wire mode.

Thereby, the vehicle operator is prevented from experiencing any discomfort in an even more effective manner.

Preferably, the control unit is configured to terminate the position keep control upon completion of engaging the clutch.

Thereby, the position keep control is prevented from interfering with the power assist mode operation of the steering system.

BRIEF DESCRIPTION OF THE DRAWING(S)

Thus, according to the present invention, there is provided a steer by wire steering system for a vehicle that can minimize discomfort to a vehicle operator at the time of a failure of the steering system.

FIG. 1 is a see-through schematic perspective view of a front part of a vehicle according to an embodiment of the present invention;

FIG. 2a is a sectional view of a clutch shown in FIG. 1 when the clutch is disengaged;

FIG. 2b is a view similar to FIG. 2a when the clutch is engaged;

DESCRIPTION OF THE PREFERRED EMBODIMENT(S)

Figure 3:
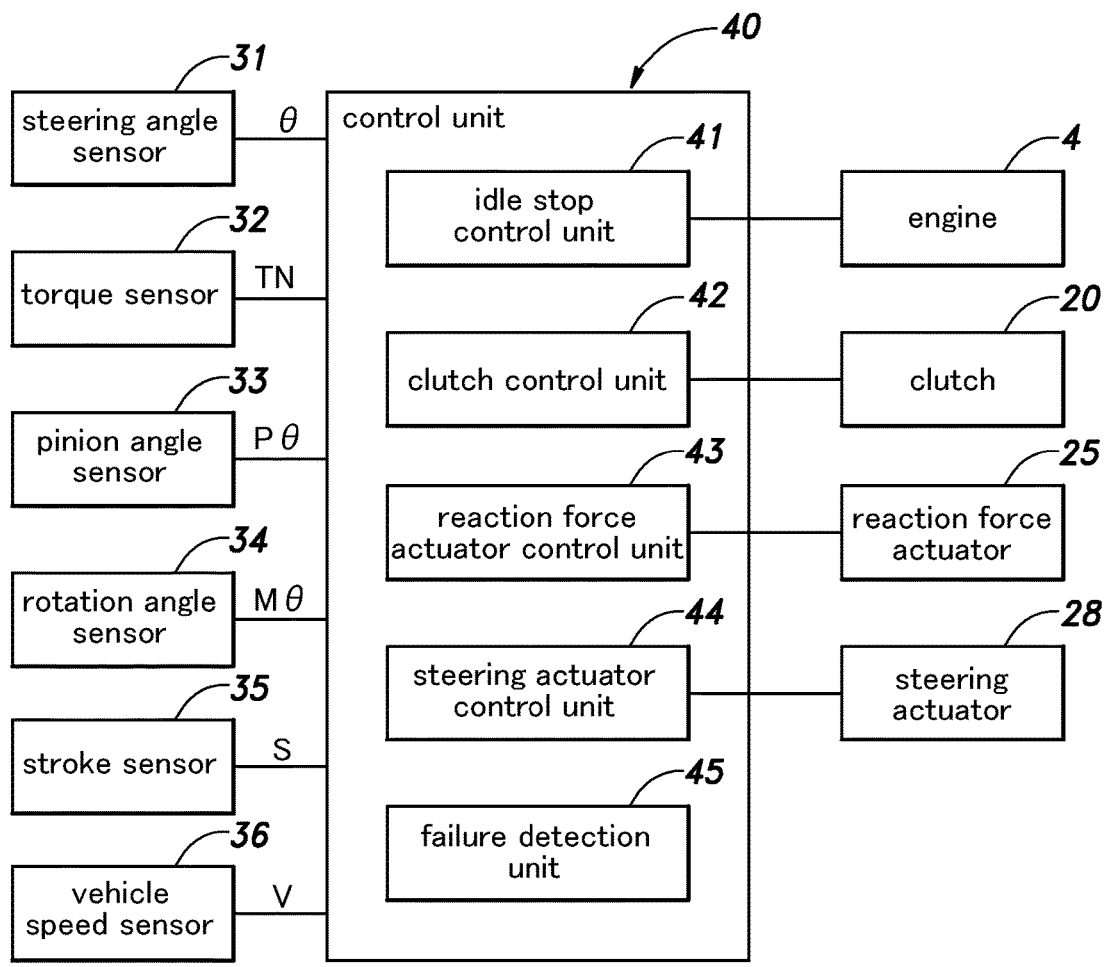
FIG. 3 is a functional block diagram of a control unit shown in FIG. 1.

A preferred embodiment of the present invention is described in the following with reference to the appended drawings.

FIG. 1 is a see-through schematic perspective view of a front part of a vehicle according to an embodiment of the present invention. The vehicle 1 consists of a four-wheeled vehicle including a pair of front wheels 3 supported by a vehicle body 2 so as to be steerable via respective front suspension systems. An engine room is formed in the front part of the vehicle body 2, and a cabin is formed behind the engine room. An internal combustion engine 4 for powering the front wheels 3 is housed in the engine room. A driver's seat is provided on a front left side part of the cabin, and a steering system 10 for steering the front wheels 3 is provided between the driver's seat and the front wheels 3.

The steering system 10 includes a steering wheel 11 (or a steering member) arranged in front of the driver's seat to receive a steering input from the driver. A steering shaft 12 is integrally and centrally attached to the steering wheel 11 to extend forward and downward, and is rotatably supported by the vehicle body 2 via a steering column support 13. The steering shaft 12 extends beyond the steering column support 13, and is connected, at the lower end thereof, to a rack and pinion steering gear box 14 via a clutch 20.

The clutch 20 is configured to selectively connect the steering wheel 11 to the input end of the steering gear box 14.

FIGS. 2a and 2b are sectional views of the clutch 20 when the clutch 20 is disengaged and engaged, respectively. The clutch 20 includes an input member 21 consisting of a cylindrical member, an output member 22 consisting of a rod member formed with a cam profile and surrounded by the input member 21, a switch mechanism 23 for selectively engaging the input member 21 and the output member 22 with each other, a solenoid device 24 for actuating the switch mechanism 23, and a cylindrical clutch case 20a housing these components therein in a coaxial manner. In this clutch 20, the input member 21 and the output member 22 are interchangeable.

The input member 21 and the output member 22 are rotatably supported by the clutch case 20a. The output member 22 is provided with a substantially triangular prism shape in cross section so that the cam profile defined by the output member 22 includes three trapezoidal projections (or projections each having flattened apex) projecting radially from the output member 22 in cross sectional view. For the details of this clutch 20, reference may be made to JP5840168B.

The switch mechanism 23 includes six rollers 23a interposed between the inner circumferential surface of the input member 21 and planar sections of the cam profile, three spring members 23b each urging the corresponding pair of rollers 23a on the corresponding planar section of the cam profile away from each other, and three wedge members 23c positioned in the respective spaces defined by the rollers 23a belonging to the different planar sections of the cam profile. The wedge members 23c are commonly connected to a base member (not shown in the drawings) which can be selectively actuated in the axial direction by the solenoid device 24. Each wedge member 23c is tapered in the axial direction.

The solenoid device 24 is configured to axially move the wedge members 23c between an engaged position where the two rollers 23a on each planar section of the cam profile are pushed against the opposing inner wall surface of the input member 21 under the spring force of the corresponding spring member 23b (as shown in FIG. 2a) without the wedge members 23c acting upon the rollers 23a, and a disengaged position where the two rollers 23a on each planar section of the cam profile are pushed toward each other by the corresponding wedge members 23c pushing the two rollers 23a toward each other against the spring force of the corresponding spring member 23b (as shown in FIG. 2b).

When the solenoid device 24 is not energized, the wedge members 23c do not act upon the rollers 23a (the engaged position) as shown in FIG. 2a so that the input member 21 and the output member 22 are held rotationally fast to each other owing to the intervention of the rollers 23a between the two members. When the solenoid device 24 is energized, the wedge members 23c push the rollers 23a away from the inner circumferential surface of the input member 21 (the disengaged position) as shown in FIG. 2b so that the input member 21 and the output member 22 are freely rotatable relative to each other.

As shown in FIG. 1, a part of the steering shaft 12 above the clutch 20 is provided with a reaction force actuator 25 including a reaction force motor 26 consisting of an electric motor for supplying a steering reaction force (torque) to the steering wheel 11 when the clutch 20 is disengaged.

The reaction force motor 26 is connected to a per se known bridge circuit which can function as a dynamic brake by selectively forming a closed circuit including the motor coils and a resistor. When the reaction force motor 26 operates as a dynamic brake, a brake torque proportional to the rotational speed of the steering wheel 11 is produced.

The steering gear box 14 is provided with a steering actuator 28 which applies a steering torque in response to the steering input from the steering wheel 11 when the clutch 20 is disengaged. The steering actuator 28 includes a steering motor 29 consisting of an electric motor for supplying a steering torque (possibly in the form of a thrust force) to the rack of the steering gear box 14.

When the clutch 20 is engaged, the reaction force actuator 25 and/or the steering actuator 28 supplies an assist torque corresponding to the steering input from the steering wheel 11 to the steering shaft 12 or the rack. When the clutch 20 is engaged, the steering angle Θ (steering output angle) of the front wheels 3 is proportional to the steering angle θ (steering input angle) of the steering wheel 11.

When the clutch 20 is disengaged, the steering angle Θ of the front wheels 3 is determined as a mathematical function of the steering angle θ of the steering wheel 11 which may take into account the vehicle speed and other factors, and the steering actuator 28 is controlled to steer the front wheels 3 to the steering angle Θ. Namely, the steering wheel 11 is mechanically disconnected from the front wheels 3 so that the steering system 10 is constituted as a steer by wire system.

A steering angle sensor 31 for detecting the steering angle θ of the steering wheel 11 is provided in an upper part of the steering shaft 12, and a torque sensor 32 for detecting a steering torque TN applied to the steering wheel 11 is provided in a part of the steering shaft 12 located above the reaction force actuator 25. The steering gear box 14 is provided with a pinion angle sensor 33 for detecting the rotational angle Pθ of the pinion. The reaction force actuator 25 is provided with a rotation angle sensor 34 (resolver) for detecting the rotational angle Mθ of the reaction force motor 26. The steering actuator 28 is further provided with a stroke sensor 35 for detecting the stroke S of the rack. The vehicle 1 is further provided with a vehicle speed sensor 36 for detecting the traveling speed V of the vehicle 1. Detection signals of these sensors 31 to 36 are forwarded to a control unit 40 provided in a suitable part of the vehicle 1.

The rotational angle Pθ of the pinion detected by the pinion angle sensor 33 and the stroke S of the rack detected by the stroke sensor 35 correspond to the steering angle Θ of the front wheels 3 in a fixed relationship. Further, as described above, when the clutch 20 is engaged, the steering angle Θ of the front wheels 3 corresponds to the steering angle θ of the steering wheel 11 in a fixed relationship, and when the clutch 20 is in the disengaged state, the steering angle Θ is related to the steering angle θ in a relationship controlled by the control unit 40.

FIG. 3 is a functional block diagram of the control unit 40. The control unit 40 consists of an electronic circuit unit including a CPU, RAM, ROM and an input/output interface. As discussed above, the sensor signals are forwarded to the control unit 40 from the steering angle sensor 31, the torque sensor 32, the pinion angle sensor 33, the rotation angle sensor 34, the stroke sensor 35, and the vehicle speed sensor 36. The control unit 40 includes, as functional units, an idle stop control unit 41 that controls stopping and restarting of the engine 4, a clutch control unit 42 that controls the operation of the clutch 20, a reaction force actuator control unit 43 for driving and controlling the reaction force actuator 25, a steering actuator control unit 44 that drives and controls the steering actuator 28, and a failure detection unit 45 for detecting a failure in the steering system 10.

The idle stop control unit 41 performs an idle stop control to stop the engine 4 when all of predetermined idle stop conditions are satisfied and to restart the engine 4 when any one of predetermined restart conditions is satisfied. The idle stop conditions for stopping the engine 4 include that the vehicle speed is equal to or lower than a certain value such as 10 km/h. Therefore, even when the vehicle 1 is traveling, if the vehicle speed falls below the first value, the idle stop control unit 41 may initiate an idle stop operation (provided that other necessary conditions are also met), and stop the engine 4. The idle stop conditions further include that the ignition switch is ON, that the engine rotational speed is equal to or higher than a predetermined value, that the absolute value of the steering angle |θ| of the steering wheel 11 is equal to or less than a prescribed value (such as 90 degrees), that the throttle opening angle is substantially zero, that the shift position is other than P, R and N, that the brake switch is ON, and the remaining charge of the battery is equal to or greater than a prescribed value. When all of these idle stop conditions are satisfied, the idle stop control unit 41 stops the engine 4. The restart conditions include that the brake switch is turned off, that the throttle opening angle is equal to or greater than a prescribed value, that the shift position is N, R or L, and that the remaining charge of the battery is less than a prescribed value, during an idle stop in each case. When any one of these restart conditions is satisfied, the idle stop control unit 41 restarts the engine 4.

When the engine 4 is started by a vehicle operator, the clutch control unit 42 supplies energization current to the solenoid device 24 to disengage the clutch 20. When the engine 4 is stopped by the vehicle operator, the clutch control unit 42 discontinues the supply of the energization current to the solenoid device 24 to engage the clutch 20. During an idle stop operation, the clutch control unit 42 continues to supply the energization current to the solenoid device 24 to keep the clutch 20 disengaged.

The control unit 40 is configured to operate in a steer by wire (SBW) mode whereby the clutch 20 is disengaged, and the reaction force actuator 25 produces a reaction force in a normal manner, and a power assist mode (EPS) whereby the reaction force actuator 25 produces an assist steering torque corresponding to the steering input applied to the steering wheel 11 (such as the steering torque TN applied to the steering wheel 11).

In the SBW mode, the steering actuator control unit 44 drives the steering actuator 28 so that the steering angle θ of the front wheels 3 corresponds to the steering angle θ of the steering wheel 11 while the clutch 20 is disengaged in a per se known manner. The reaction force actuator control unit 43 controls the reaction force actuator 25 so as to apply a prescribed reaction force (torque) to the steering wheel 11 in a per se known manner.

In the EPS mode, the control unit 40 controls the reaction force actuator control unit 43 so that an assist torque corresponding to the steering input to the steering wheel 11 may be provided by the reaction force actuator 25 while the clutch 20 is engaged.

The control unit 40 may also be configured to operate in a manual mode whereby the reaction force actuator 25 and the steering actuator 28 are both deactivated while the clutch 20 is engaged.

Typically, the steering actuator control unit 44 initiates the SBW mode operation when the engine 4 is started by the vehicle operator, and concludes the SBW mode operation when the engine 4 is cut by the vehicle operator. In the SBW mode, the clutch 20 is disengaged, and the steering actuator control unit 44 executes the normal steering angle control for the steering actuator 28. During an idle stop operation, the steering actuator control unit 44 executes a position keep control whereby the steering actuator 28 is controlled so as to maintain the steering angle θ of the front wheels as it is if the vehicle speed V is lower than the first value. The position keep control may comprise operating the steering motor 29 as an electromagnetic brake by supplying electric current to the steering motor 29 so as to produce a brake torque. Alternatively, the two ends of the steering motor 29 may be connected to each other directly or via a resistor so that the steering motor 29 may function as a dynamic brake. During the idle stop operation, the clutch control unit 42 continues to supply electric current to the solenoid device 24 to keep the clutch 20 disengaged. When the idle stop control unit 41 has terminated the idle stop operation, and restarted the engine 4, the steering actuator control unit 44 resumes the steering angle control via the steering actuator 28.

In the SBW mode, the reaction force actuator control unit 43 normally controls the reaction force actuator 25 so as to provide a prescribed reaction force to the steering wheel 11. However, during an idle stop operation, the reaction force actuator control unit 43 controls the reaction force actuator 25 so as to operate the reaction force motor 26 as a dynamic brake.

The failure detection unit 45 is configured to detect a failure in any of the functional units of the control unit 40 and devices associated with the steering system 10 as well as the steering angle sensor 31, the torque sensor 32, the pinion angle sensor 33, the rotation angle sensor 34, the stroke sensor 35, and the vehicle speed sensor 36. The failure detection unit 45 may perform a diagnostic routine at the time of startup or any other time, and may be configured to identify the nature of the failure and/or the location where the failure has occurred.

For instance, when any of the pinion angle sensor 33, the rotation angle sensor 34 and the stroke sensor 35 indicates a certain large property value or a significant change in value while the detection value of the steering angle sensor 31 and/or the torque sensor 32 is almost zero, the failure detection unit 45 may detect a failure.

When any failure is detected by the failure detection unit 45, depending on the nature and location of the failure, the control unit 40 controls the clutch control unit 42, the reaction force actuator control unit 43, and the steering actuator control unit 44 in a corresponding manner according to a prescribed rule incorporated in the control unit 40.

For instance, when the failure detection unit 45 has detected a failure in the pinion angle sensor 33, the rotation angle sensor 34, the stroke sensor 35 or the vehicle speed sensor 36, the clutch control unit 42 commands engagement of the clutch 20, and the reaction force actuator control unit 43 initiates operating the reaction force actuator 25 as a steering assist motor while the steering actuator control unit 44 ceases normal control of the steering actuator 28. Details of the control when a failure is detected will be discussed hereinafter.

Once the clutch control unit 42 engages the clutch 20, no electric current is supplied to the solenoid device 24. However, it requires a certain time period for completing the engaged state of the clutch 20 (from the time when the electric current ceases to be supplied to the solenoid device 24 to the time when the clutch 20 is fully engaged). This may be attributed to an electromagnetic delay in producing the force required to engage the clutch from the time point of initially discontinuing the supply of electric current, and a mechanical delay in completing the mechanical action for engaging the clutch. During this brief period, an external force, for instance, caused by a surface irregularity may cause a change in the steering angle of the front wheels 3.

Therefore, the steering actuator 28 performs a position keep control for a prescribed time period T equal to or greater than this brief period.

When the clutch 20 starts getting partly engaged, an impulsive torque may be transmitted from the front wheel 3 to the steering wheel 11. To mitigate this problem, upon detection of a failure, the reaction force actuator control unit 43 terminates the SBW mode, and starts a steering assist control with the reaction force actuator 25. In the illustrated embodiment, immediately after the clutch control unit 42 terminates supplying electric current to the reaction force actuator 25 (or immediately after a failure is detected), the reaction force actuator control unit 43 switches from the reaction force control to the steering assist control.

Figure 4:
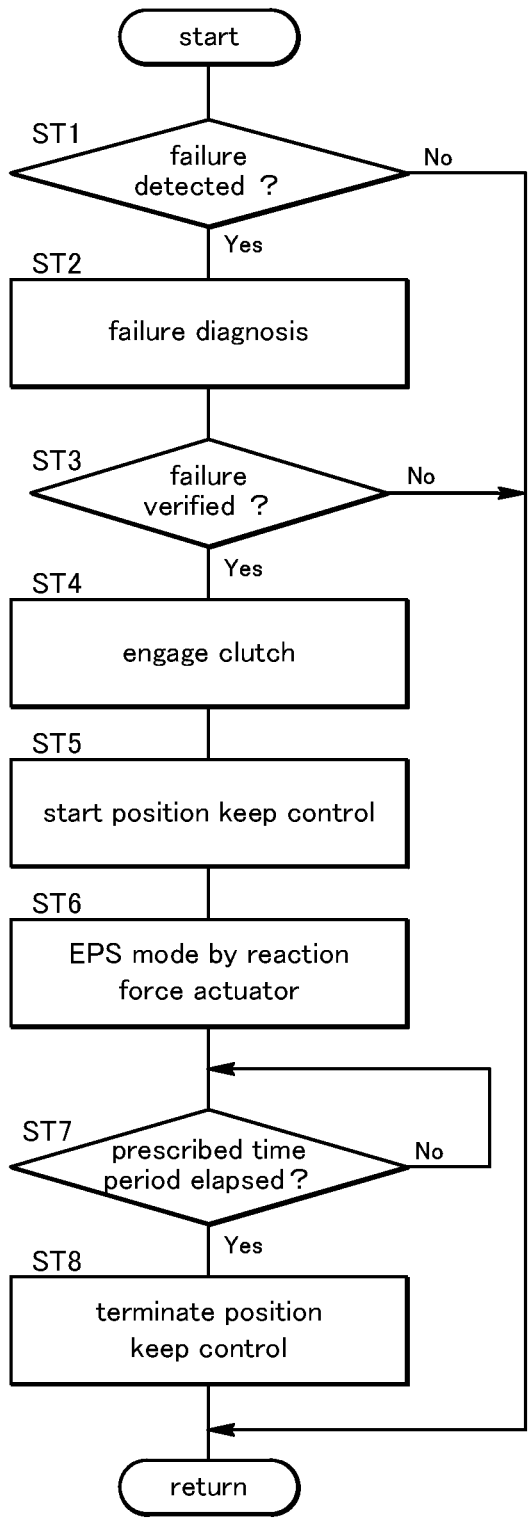
FIG. 4 is a flowchart showing a control process that may be executed during a steer by wire mode operation of the control unit.

FIG. 4 is a flowchart showing a control process performed by the control unit 40 during the execution of the SBW mode. When the engine 4 is started by the vehicle operator, the control unit 40 starts the control in the SBW mode and repeats the control process discussed in the following. First, the control unit 40 determines if any failure has occurred in a device associated with the steering system of the vehicle (step ST1). If no failure is detected (step ST1: No), the control flow returns to the main flow without taking any action. When a failure is detected (step ST1: Yes), the control unit 40 performs a failure diagnosis in accordance with a predetermined procedure to determine the nature and location of the failure (step ST2).

If no failure is identified, the control flow returns to the main flow without taking any action. If a failure has in fact occurred, and identified in step ST3 (step ST3: Yes), the control unit 40 engages the clutch 20 by discontinuing the supply of electric current to the solenoid device 24 (step ST4). At the same time, the control unit 40 terminates the SBW mode operation of the steering actuator 28, and performs the position keep control of the steering actuator 28 (step ST5), instead. The control unit 40 also terminates the SBW mode operation of the reaction force actuator 25, and performs the steering assist control of the reaction force actuator 25 (step ST6). The process in steps ST4 to ST6 may be performed substantially simultaneously, but the order of these steps may be changed if desired.

Thereafter, in step ST7, the control unit 40 determines if a prescribed time period T required for the clutch 20 to get fully engaged has elapsed from the time point at which the supply of electric current to the solenoid device 24 is discontinued in step ST4. Typically, the prescribed time period T may be selected to be longer than the actually required for the clutch 20 to get fully engaged with a certain margin. While the prescribed time period T has not elapsed, the process of step ST7 is repeated. When the prescribed time period T has elapsed (step ST7: Yes), the position keep control for the steering actuator 28 is terminated (step ST8), and the program flow returns to the main flow. Thereafter, the control unit 40 continues the control of the reaction force actuator 25 in the EPS mode (steering assist control) from the time point at which the SBW mode ended, and the clutch 20 was commanded to be engaged.

Figure 5:
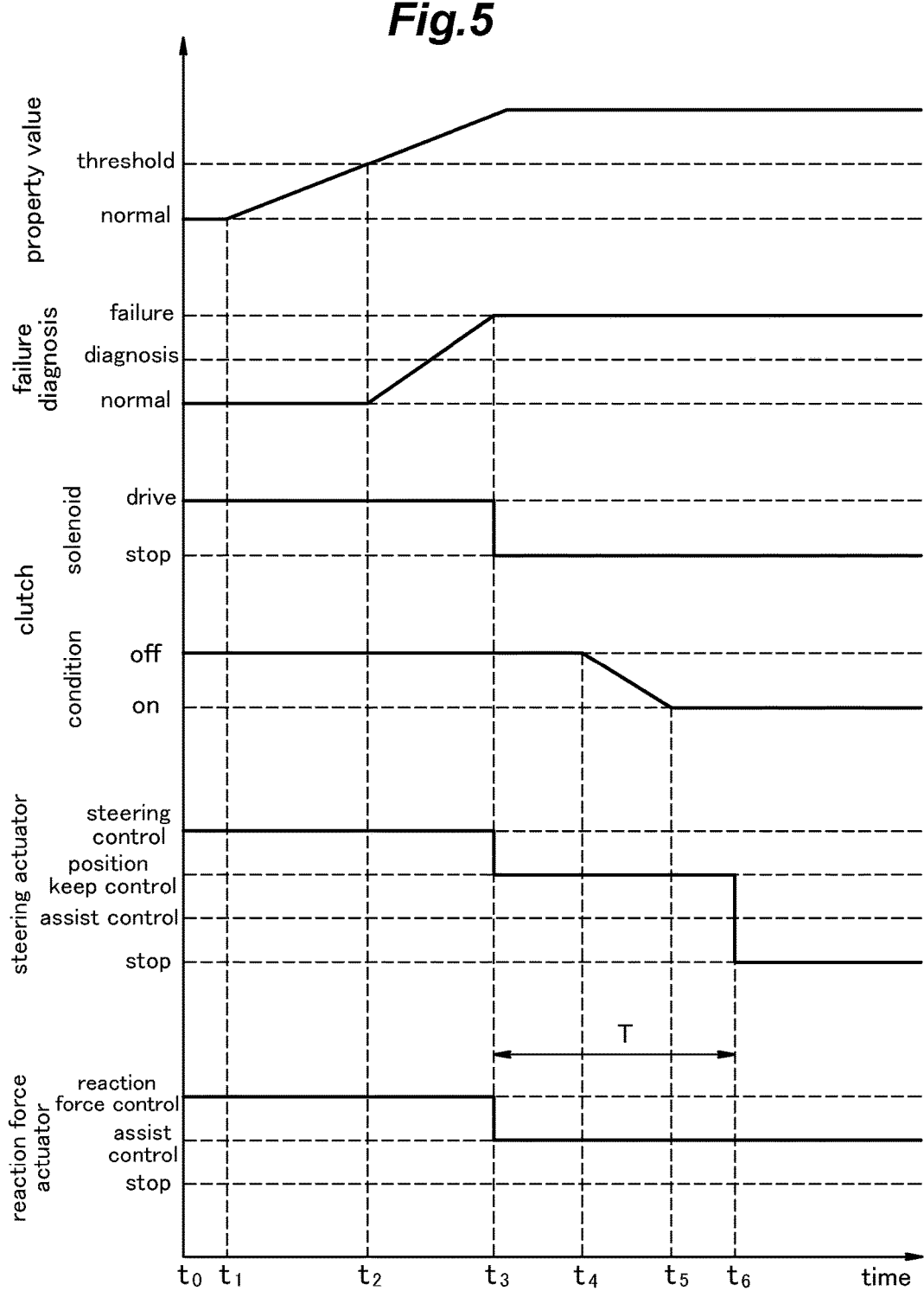
FIG. 5 is a time chart of showing a control process executed by the control unit.

FIG. 5 is a time chart showing a typical control process of the illustrated embodiment. At time t0, the control unit 40 is operating in the SBW mode. More specifically, the solenoid device 24 is energized so that the clutch 20 is disengaged, the normal steering control is being executed by the steering actuator 28 while the reaction force control is being performed by the reaction force actuator 25. A device associated with the steering system is demonstrating a normal property value (as shown in the uppermost part of the time chart), and the control unit 40 determines that no fault is present in the control system.

The device in question starts behaving abnormally at time t1, and a certain property value of the device exceeds a prescribed threshold value at time t2. The diagnostic procedure is then performed by the control unit 40. A failure of the device is determined by the control unit 40 at time point t3, and this triggers a series of events. The solenoid device 24 is de-energized so that the clutch 20 is engaged over a time period. The control mode of the steering actuator 28 is switched from the steering angle control to the position keep control. The control mode of the reaction force actuator 25 is switched from the reaction force control to the steering assist control.

The supply of electric current to the solenoid device 24 is stopped at time point t3. However, the clutch 20 starts to be engaged only at time point t4 (a short time after time point t3), and becomes fully engaged at time point t5 (a short time after time point t4).

The steering actuator 28 stops the SBW mode at time point t3, and starts the position keep control. The position keep control is continued until time point t6 (a short time after time point t5). At time point t6, the control of the steering actuator 28 ends, or in other words, the two ends of the steering motor 29 is kept open.

When the clutch 20 becomes fully engaged at time point t5, an impulsive torque may be applied from the front wheels 3 to the steering wheel 11, and this may cause a discomfort to the vehicle operator. However, in the illustrated embodiment, the position keep control of the steering actuator 28 is maintained until a short time period has elapsed after time point t5 at which the clutch 20 becomes engaged, such an impulsive torque is prevented from being transmitted to the steering wheel 11.

When the clutch 20 is being progressively brought into a fully engaged state from time point t4 to time point t5, an impact may be generated by the connection between the front wheel 3 and the steering wheel 11. However, in the present embodiment, an assist control is performed by the reaction force actuator 25 at least throughout the entire time period during which the clutch 20 is being engaged.

If any impact is detected by the torque sensor 32 at this time, the reaction force actuator 25 generates an assist torque that counteracts the impact. Therefore, the vehicle operator is prevented from experiencing any significant discomfort that this impact could otherwise cause.

As described above, in the present embodiment, when a failure is determined by the failure detection unit 45 (step ST3: Yes, time point t3) while the steering system is operating in the SBW mode, the SBW mode is terminated, and the position keep control of the steering actuator 28 is started so that the steering angle θ of the front wheels 3 is kept fixed by supplying electric current to the steering motor 29 (step ST5, time point t3). Thereby, the front wheels 3 are prevented from being steered by an external force so that the stability of the vehicle can be maintained, and the vehicle operator holding the steering wheel 11 is prevented from experiencing any discomfort.

When a failure is determined by the failure detection unit 45 (step ST3: Yes, time point t3) while the steering system is operating in the SBW mode, the steering assist control by the reaction force actuator 25 in the EPS mode is started before the clutch 20 starts to be engaged at time point t4 (step ST4, time point t3). Thereby, the impact that may be caused by the initial phase of engaging the clutch 20 is prevented from being transmitted to the vehicle operator holding the steering wheel 11. Preferably, the steering assist control by the reaction force actuator 25 in the EPS mode may be started simultaneously with or slightly after the issuance of the command to engage the clutch 20.

Upon elapsing of the prescribed time period T which in this case extends over the entire duration of the process of engaging the clutch 20 with a certain margin, the position keep control of the steering actuator 28 is terminated (step ST8, time point t6) so that the front wheels 3 can be steered without encountering any significant resistance by the vehicle operator assisted by the reaction force actuator 25. At this time, the two ends of the steering motor 29 may be kept open to minimize the resistance by the steering motor 29.

Although the present invention has been described in terms of a preferred embodiment thereof, it is obvious to a person skilled in the art that various alterations and modifications are possible without departing from the scope of the present invention. For in the illustrated embodiment, the prescribed time period T was used for determining the timing for discontinuing the position keep control, but it is also possible to directly detect the full engagement of the clutch 20 by use of a dedicated sensor or indirectly detect the full engagement of the clutch 20 based on the detection value of the torque sensor 32 or the like, and this detection result may be used for determining the timing for discontinuing the position keep control. The failure detection unit 45 formed a part of the control unit 40 in the foregoing embodiment, but may also be provided separately from the control unit 40.

Figure 6:
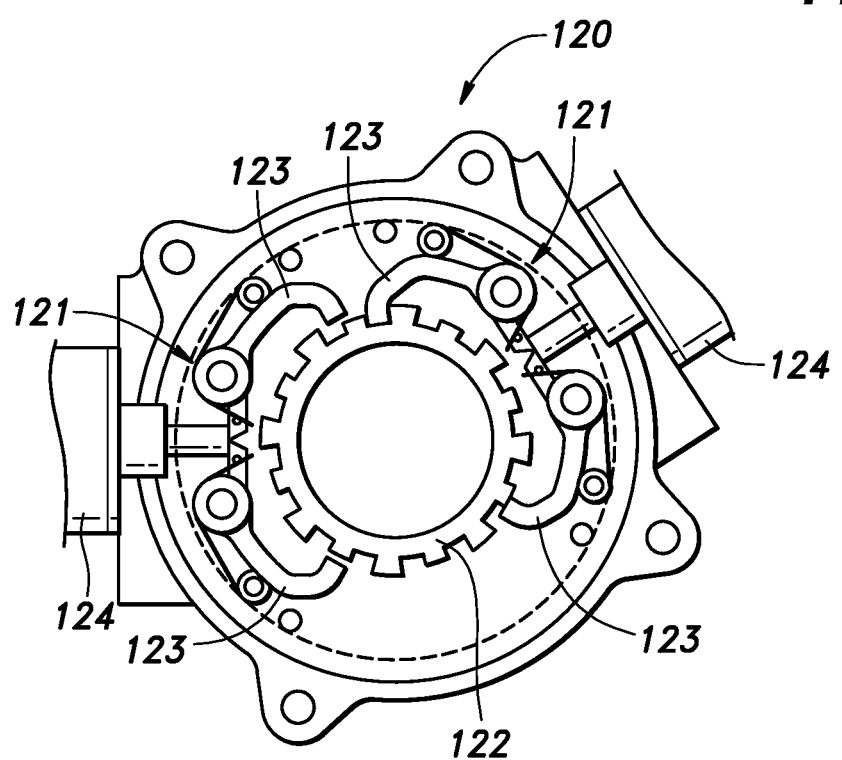
FIG. 6 is an alternate embodiment of the clutch.

FIG. 6 shows an alternate embodiment of the clutch 120. The clutch 120 includes a planetary gear mechanism (not shown in the drawing) and a lock device 121. The steering shaft 12 on the side of the steering wheel 11 is coaxially fixed to an annular internal gear of the planetary gear mechanism. The steering shaft 12 on the side of the rack and pinion steering gear box 14 is coaxially fixed to a planet carrier of the planetary gear mechanism (rotatably supporting planetary gears meshing with the annular internal gear). The lock device 121 selectively permits and prohibits the rotation of a sun gear of the planetary gear mechanism that meshes with the planetary gears.

The lock device 121 includes a locking gear 122 consisting of an external gear and configured so as to rotate integrally and coaxially with the sun gear, and a plurality of lock levers 123 each having a distal end and a proximal end, and pivotally supported at an intermediate portion adjoining the proximal end so that each lock lever 123 can pivot between an engaged position where the distal end is displaced radially inward into engagement with the locking gear 122 and a disengaged position where the distal end is displaced radially outward out of engagement with the locking gear 122. The lock levers 123 normally engage the locking gear 122 under the spring force of spring members not shown in the drawings. The lock device 121 further includes a pair of electromagnetic solenoids 124 for selectively pushing the proximal ends of the lock levers 123 in a radially inward direction so that the lock levers 123 are displaced away from the locking gear 122 against the biasing force of the spring members.

When the electromagnetic solenoids 124 are turned off so that each lock lever 123 engages a tooth of the locking gear 122, the rotational motion of the sun gear is prevented. As a result, the rotational movement of the steering wheel 11 is transmitted to the input end of the rack and pinion steering gear box 14. In other words, when the clutch 120 is engaged, the steering wheel 11 is mechanically coupled with the front wheels 3. On the other hand, when the electromagnetic solenoids 124 are turned on so that the lock levers 123 each is disengaged from the corresponding tooth of the locking gear 122, the rotation of the sun gear is permitted. As a result, the steering wheel 11 is mechanically decoupled from the front wheels 3.

Thus, when the clutch 120 is engaged, the steering input applied to the steering wheel 11 is transmitted to the front wheels 3 as a steering output via the rack and pinion steering gear box 14. However, the clutch 120 is normally disengaged so that a steer by wire operation may be performed, and becomes engaged when the steer by wire operation cannot be performed owing to a system failure or the like.

In this embodiment also, as shown in the time chart of FIG. 5, the clutch 120 requires a certain time period between the time at which a command to engage the clutch 120 is received (t3 in FIG. 5) and the time at which the clutch 120 becomes fully engaged (t5 in FIG. 5). This embodiment may be otherwise similar to the preceding embodiment in terms of structure and effect.

The invention claimed is:

1. A steer by wire steering system for a vehicle, comprising:
   a steering member for receiving a steering input;
   a reaction force actuator for applying a reaction force to the steering member;
   a steering actuator for steering a road wheel;

a clutch for selectively connecting the road wheel mechanically to the steering member;

a control unit for controlling operation of the reaction force actuator, the steering actuator and the clutch; and a failure detection unit for detecting a failure in the steering system;

wherein the control unit is configured to operate in a steer by wire mode whereby the clutch is disengaged, and the reaction force actuator produces a reaction force in a normal manner, and a power assist mode whereby the reaction force actuator produces an assist steering torque corresponding to the steering input applied to the steering member; and wherein the control unit is configured to operate in an emergency mode when a failure is detected by the failure detection unit while the control unit is operating in the steer by wire mode;

the emergency mode including commanding the clutch to engage, terminating the steer by wire mode, performing a position keep control whereby the steering actuator is driven so as to maintain a fixed steering angle of the road wheel, initiating the power assist mode, and once the clutch is fully engaged, terminating the position keep control.

2. The steer by wire steering system according to claim 1, wherein the control unit is configured to start the power assist mode using the reaction force actuator before the clutch becomes at least partly engaged when a failure is detected by the failure detection unit while the control unit is operating in the steer by wire mode.

3. The steer by wire steering system according to claim 1, wherein the control unit is configured to start the power assist mode using the reaction force actuator simultaneously as commanding the clutch to be engaged when a failure is detected by the failure detection unit while the control unit is operating in the steer by wire mode.

4. The steer by wire steering system according to claim 1, wherein the control unit is configured to terminate the position keep control upon completion of engaging the clutch.

* * * * *